(12) United States Patent
Bahler

(10) Patent No.: US 7,818,888 B2
(45) Date of Patent: Oct. 26, 2010

(54) TRACER

(75) Inventor: Philip J. Bahler, Tolland, CT (US)

(73) Assignee: Toolbro Innovators LLC, South Windsor, CT (US)

( * ) Notice: Subject to any disclaimer, the term of this patent is extended or adjusted under 35 U.S.C. 154(b) by 144 days.

(21) Appl. No.: 12/313,521

(22) Filed: Nov. 21, 2008

(65) Prior Publication Data

US 2009/0199422 A1    Aug. 13, 2009

Related U.S. Application Data

(60) Provisional application No. 61/004,337, filed on Nov. 27, 2007.

(51) Int. Cl.
  *B43L 13/02* (2006.01)
  *B25H 7/04* (2006.01)
(52) U.S. Cl. .............................. 33/42; 33/32.2; 33/41.3; 33/518
(58) Field of Classification Search .................... 33/26, 33/27.06, 27.12, 32.2, 32.3, 41.1, 41.3, 41.6, 33/42, 44, 45, 518
See application file for complete search history.

(56) References Cited

U.S. PATENT DOCUMENTS

| | | | | |
|---|---|---|---|---|
| 1,530,796 A | * | 3/1925 | Thomsen | .......................... 33/44 |
| 1,598,993 A | * | 9/1926 | Vlazny | ............................ 33/42 |
| 2,529,210 A | * | 11/1950 | Butler | ............................ 33/44 |
| 2,660,791 A | * | 12/1953 | Howell et al. | ................ 33/41.6 |
| 3,286,351 A | | 11/1966 | McAlister | |
| 3,378,927 A | * | 4/1968 | Lowery | .......................... 33/26 |
| 3,885,315 A | * | 5/1975 | Polselli et al. | .................. 33/42 |
| 4,531,296 A | * | 7/1985 | Veeze | ........................... 33/670 |
| 4,656,744 A | | 4/1987 | Decker | |
| 4,903,409 A | * | 2/1990 | Kaplan et al. | ................... 33/42 |
| 5,083,375 A | * | 1/1992 | Helm, Sr. | ........................ 33/42 |
| D337,535 S | | 7/1993 | Knowlton | |
| 5,265,342 A | | 11/1993 | Lang, Jr. | |
| 5,295,308 A | | 3/1994 | Stevens et al. | |
| 5,471,753 A | * | 12/1995 | Rodrigues | ....................... 33/42 |
| 6,044,570 A | | 4/2000 | Nochowitz | |
| 6,334,259 B1 | | 1/2002 | Harvey | |
| 6,467,174 B1 | | 10/2002 | Kotori | |
| 6,629,370 B1 | | 10/2003 | Sposato | |
| 7,231,720 B2 | | 6/2007 | Allen | |
| 7,451,547 B1 | * | 11/2008 | Lantinen | ......................... 33/42 |
| 2002/0032969 A1 | | 3/2002 | Cardew | |
| 2003/0033724 A1 | | 2/2003 | Barbosa | |

FOREIGN PATENT DOCUMENTS

FR          2600591 A1 * 12/1987

* cited by examiner

*Primary Examiner*—R. A. Smith
(74) *Attorney, Agent, or Firm*—Ira S. Dorman

(57) ABSTRACT

A hand tool for tracing the course of a line of pavers at a distance selectively spaced therefrom, so as to facilitate the construction of uniform borders along a walkway, path, or the like, consists of a tracking head for running the tool along the installed line of pavers, a marking head for remotely replicating the course, a beam on which the heads are mounted, and a handle. The positions of the marking head and handle are longitudinally adjustable on the beam, relative to the tracking head.

6 Claims, 3 Drawing Sheets

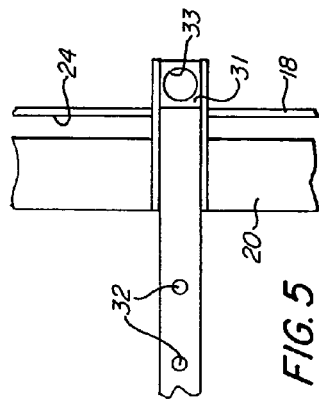
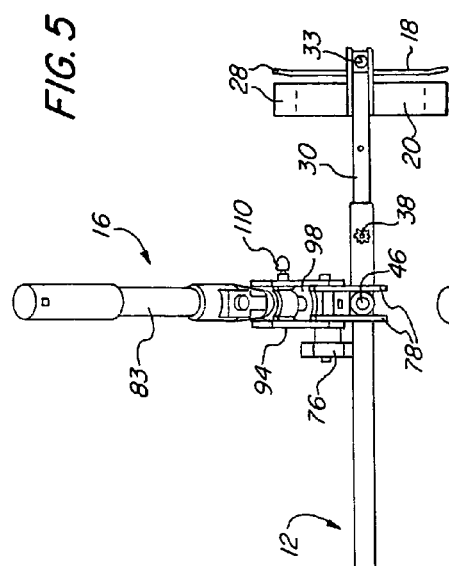
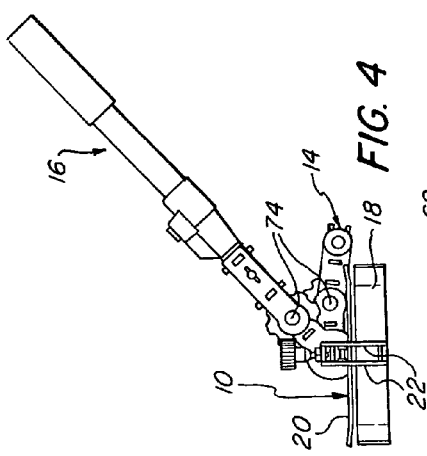
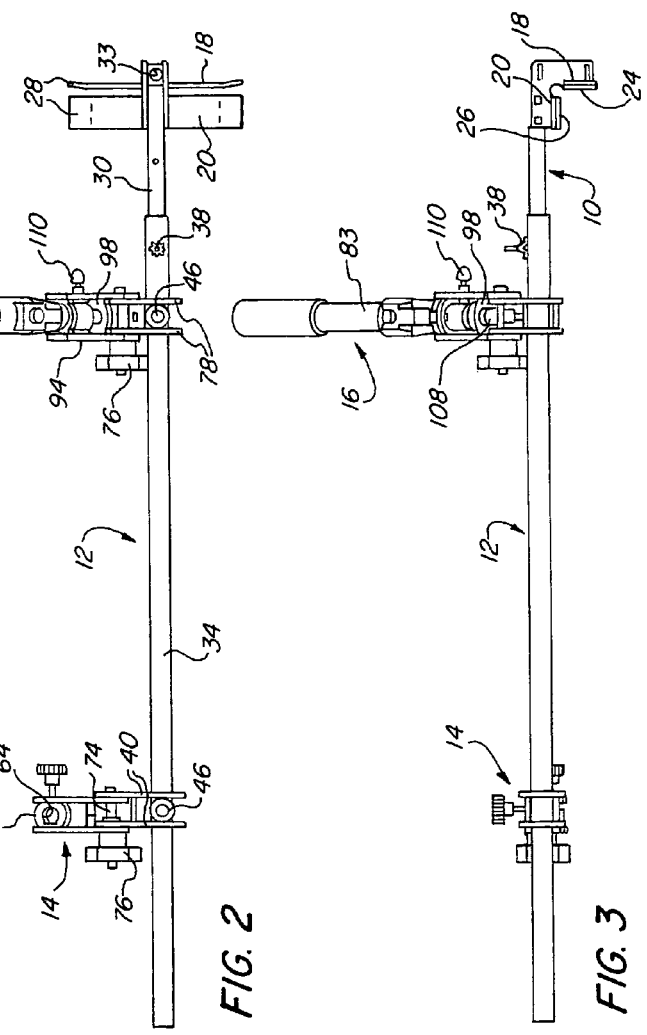

TRACER

CROSS REFERENCE TO RELATED APPLICATION

This application claims the benefit of U.S. Provisional Patent Application No. 61/004,337, filed Nov. 27, 2007, the entire specification of which is incorporated hereinto by reference thereto.

BACKGROUND OF THE INVENTION

When a walkway, path, or driveway having borders made of pavers (e.g., blocks, bricks, and the like) is constructed, it is often important that the course of pavers on one side substantially duplicate the course on the other side, and that the width of the construction be constant (unless a nonuniform way is to be created intentionally). Desired uniformity is most effectively achieved by transferring the line formed by pavers installed on one side of the construction to the opposite side, and it is believed that there has not heretofore been provided a satisfactory tool for enabling such replication.

SUMMARY OF THE INVENTION

Accordingly, it is the broad object of the present invention to provide a manual tool for marking a trace that substantially duplicates, at a constant distance, an installed course of pavers.

A more specific object of the invention is to provide such a tool that is highly effective for its intended purpose, is facile to use, is of incomplex construction, and is economical to manufacture.

It has now been found that the foregoing and related objects of the invention are attained by the provision of a tool comprised of a tracking head, a beam, a marking head, and a handle. The tracking head is constructed to be run along a course of pavers, and is comprised of a top plate and a side plate, the plates having generally planar inner surfaces disposed at a right angle at one another and defining an interior space that is open at the bottom, at the ends, and along one side; the opposite end portions of each plate are desirably turned outwardly from its inner surface. The beam of the tool is attached to the tracking head, and extends therefrom in a non-obstructing relationship to the interior space thereof and in a longitudinal direction generally perpendicular to, and away from, the inner surface of the side plate; the top plate is disposed to the inner side of the side plate. The marking head is mounted on the beam for positioning along its length, and means is provided for affixing the marking head at selected distances away from the tracking head. Similarly, the handle is mounted on the beam for lengthwise positioning, and means is also provided for affixing the handle at selected distances away from the tracking head; normally the handle will extend in a plane to which the longitudinal axis of the beam is normal.

In preferred embodiments of the invention, the tracking head of the tool will additionally comprise means for receiving an upstanding post, so as to permit rotational movement thereabout (such as for marking circular courses). The tracking head may include a rectilinear mounting bar, with the beam having a tubular rectilinear end portion dimensioned and configured to telescopically receive, in an open end thereof, the mounting bar of the tracking head (or vice versa). In such instances, the tool will additionally include means for affixing the mounting bar and of the beam at a plurality of positions of relative extension.

The marking head will normally include means for fixedly attaching a marking implement, and it will advantageously be comprised of an attachment part, for attaching the marking implement, and a mounting part for mounting the marking head on the beam, the parts of the head being joined for relative pivotable movement about an axis parallel to the longitudinal axis of the beam. Normally, the handle of the tool will be mounted on the beam in an intermediate position, between the tracking head and the marking head.

BRIEF DESCRIPTION OF THE DRAWINGS

FIGS. 2, 3, and 4 are, respectively, top plan, front, and end views of the tool of FIG. 1, drawn to a somewhat reduced scale;

FIG. 5 is a fragmentary plan view of the tracking head of which the tool of the foregoing figures is comprised, drawn to an enlarged scale;

DETAILED DESCRIPTION OF THE PREFERRED AND ILLUSTRATED EMBODIMENTS

Figure 1:
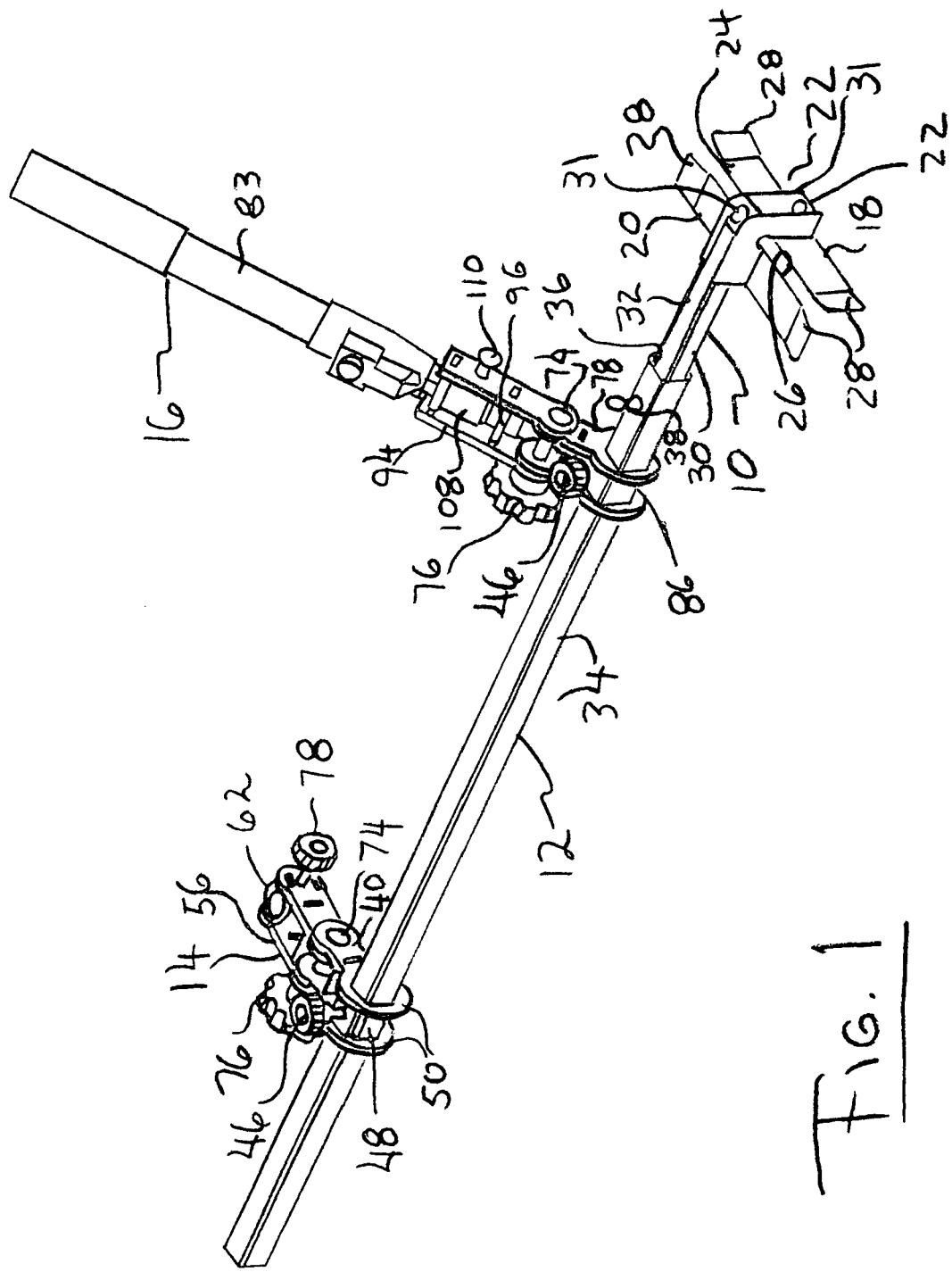
FIG. 1 of the drawings is a perspective view of a tracer tool embodying the present invention.

Turning now in detail to the appended drawings, therein illustrated is a tracing tool embodying the present invention and consisting of a tracking head, a beam, a marking head, and a handle, generally designated respectively by the numerals 10, 12, 14, and 16. The tracking head 10 consists of a normally vertical side plate 18 and a normally horizontal top plate 20, affixed in a right-angular relationship to one another by a pair of angle brackets 22 and having inside surfaces 24, 26, respectively, disposed to define an included angle of 90°. The opposite end portions 28 of each plate 18, 20 are turned (curvilinearly, or by an angle bend) outwardly so as to facilitate entry into the interior space defined, without catching, of the pavers of a course that is to be traced.

The angle brackets 22 also affix a mounting piece or bar 30 (taking the form of square tubular stock in the illustrated embodiment), which extends in a direction away from the plates 18, 20 and generally normal to the inside surface 24 of the side plate 18. A number of pin-engaging holes 32 (only two of which are visible) are formed in the mounting bar 30 at spaced locations along its length.

The beam 12 consists essentially of a rectilinear piece 34 of square tubular stock. The mounting piece 30 of the tracking head 10 is received in an open end 36 of the tubular piece 34, in a telescopic manner, and a pin 38 is adjacently mounted for engagement in one of the holes 32 formed along the length of the piece 30. Although not illustrated, it will be appreciated that the pin 38 will normally be spring-loaded to bias it into the passage through the tubular piece 34, and it is provided with a ring-like handle element to facilitate withdrawal for adjustment of the position of extension of the tracking head 10.

Also affixed between the angle brackets 22 are a pair of square lug pieces 31, each of which is formed with a circular opening 33. The openings 33 are aligned for to receive an upstanding post or stake (not shown), providing a center point about which the tool can be rotated for marking a circle; this is of course in addition to the primary tracing function of the tool.

Figure 6A:
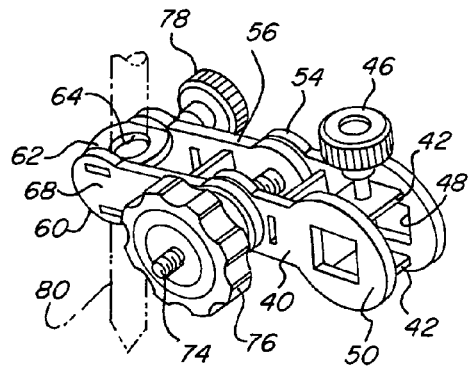
FIGS. 6A, 6B, and 6C are perspective views, drawn to a further enlarged scale, depicting the marking head of the tool and components thereof.
Figure 6B:
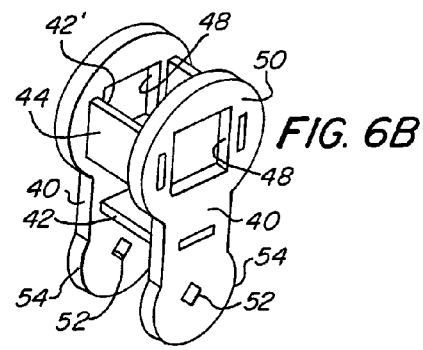
Figure 6C:
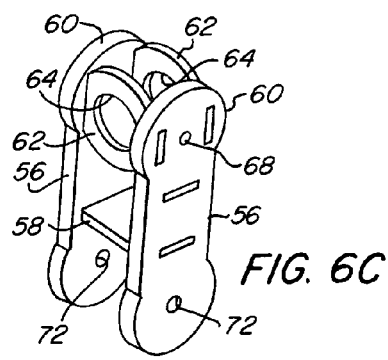

Turning now in greater detail to FIGS. 6A through 6C of the drawings, the marking head 14 is seen to consist of a mounting part comprised of a pair of legs 40 affixed in a parallel relationship by crosspieces 42, 42', the latter having a threaded aperture 44 for the receipt and engagement of a thumbscrew 46. The larger circular end portion 50 of each leg 40 is formed with a relatively large square opening 48, and a relatively small opening 52 is formed through the smaller circular portion 54 at the opposite end. As will be noted from FIGS. 1 through 4, the large square openings 48 serve to receive the piece 34 of tubular stock of which the beam 12 is constructed, and to enable slidable positioning of the marking head 14 along the length thereof; the openings 48 match the cross section of the piece 34 and prevent relative rotation about the axis of the beam. The thumbscrew 46, received in the threaded aperture 44, serves of course to secure the marking head 14 at any selected position along the length of the tubular piece 34.

The attachment part of the marking head 14 consists of a pair of arms 56, affixed in a parallel relationship by a crosspiece 58 and a pair of collars 62, which extend between end portions 60 of the arms 56; the collars 62 have circular openings 64, which are aligned on a common axis. A small threaded aperture 68 extends through the end portion 60 of each arm 56 (only one such aperture being visible), which is disposed on an axis that intersects the axis between the circular openings 64. Aligned apertures 72 extend through the circular portions 70 at the opposite ends of the arms 56.

As best seen in FIG. 6A, a carriage bolt 74 extends through the square apertures 52 and the circular apertures 72 in the legs 40 and arms 56, respectively, so as to pivotably assemble the mounting part and the attaching part of the marking head 14 to one another. A threaded knob 76 is engaged on the free end portion of the carriage bolt 74, and the square lug element of the bolt (not seen) is received in the proximate square aperture 52 of the leg 40. This constitutes a fully adjustable idler joint, which allows the marker to pivot on a horizontal axis so as to glide over a surface (which may be paved) with very little downward force. The parts of the marking head can also be affixed in any desired angular relationship to one another by tightening of the knob 76 against the adjacent arm 56, so as to permit an increased level of downward force to be applied.

As is also seen in FIG. 6A, a removable marking implement 80 (depicted in phantom line) is received in the aligned circular openings 64 of the collars 62. The implement may be a pointed post, a material-dispensing marker, or of any other suitable kind of form, and is held in place by tightening the thumbscrew 78 so as to bear upon its side.

Figure 7A:
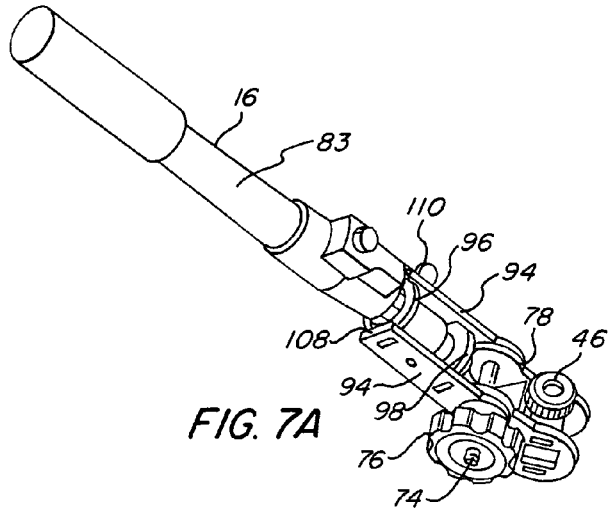
FIGS. 7A, 7B and 7C are perspective views showing the handle of the tool, including the means for mounting it on the beam, and components thereof.
Figure 7B:
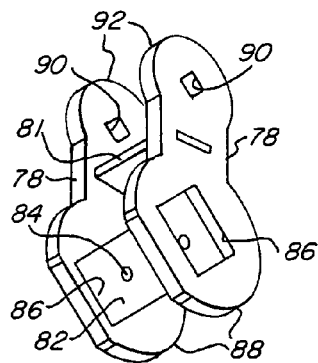
Figure 7C:
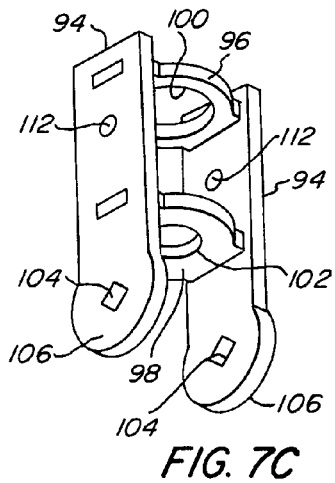

Turning now more specifically to FIGS. 7A through 7C, therein illustrated in greater detail is the handle 16 for the tool, which consists of a conventional handle piece 83, of variable length, having a cylindrical end portion 108. The fixture for assembling the handle piece 83 with the other tool components includes a mounting part consisting of a pair of legs 78 affixed in parallel relationship to one another by crosspieces 81, 82, the latter being formed with threaded, aligned apertures 84. Large square openings 86 are formed through the larger end portions 88 of the legs 78, and are aligned with one another for slidable receipt of the tubular piece 34 comprising the beam 12; the aperture 84 receives a thumbscrew 46 by which the handle 16 can be secured at selected positions along the length of the beam. The opposite end portion 92 of each leg 78 is formed with an aperture 90, again for engagement of the square lug element that is present under the head of a carriage bolt.

The attaching part of the handle fixture consists of a pair of arms 94, affixed in parallel relationship by collars 96, 98, which are formed with axially aligned, relatively large and relatively small circular holes 100, 102, respectively. The square apertures 104 formed in the end portions 106 of each arm 94 serve to receive the square lug portion of a carriage bolt 74, by which the mounting and attaching parts of the handle fixture are pivotably attached to one another; a threaded hand knob 76 is engaged on the free end of the bolt 74.

As can be seen, the arms 94 embrace the legs 78 and enable pivoting of the handle piece 83 relative to the beam piece 34, the cylindrical end portion 108 of the handle being inserted axially and engaged within the aligned circular openings 100, 102 in the collars 96, 98. A pin 110 extends through the apertures 112 to secure the handle and facilitate its separation and removal, if so desired.

In use, the vertical guide plate 18 of the tool is initially placed flat against the edge that is to be duplicated. The knob of the thumbscrew 46 on the marking head 14 is then turned to loosen the head, and the width of the tool is adjusted to adequately and accurately mark the width of the way by sliding the marking head 14 along the tubular piece 34 of the beam 12, after which the knob of the thumbscrew 46 is turned to affix the head in position. Increasing the extension of the tracking head 10 outwardly from the beam 12 permits use of the tool for wider walkways or driveways.

The handle 16 is then normally slid to the center of the tool assembly, between the tracking head 10 and the marking head 14, and affixed in position using the thumbscrew 46 thereon. The length and angular attitude of the handle can be adjusted, the latter being achieved by loosening and tightening the associated knob 76. As the user pulls the tool, the plates 18 and 20 are held tight against the edge of the pavers so that the marked line will be accurate.

Thus, it can be seen that the present invention to provides a manual tool for marking a trace that substantially duplicates, at a constant distance, an installed course of pavers. The tool is highly effective for its intended purpose, is facile to use, is of incomplex construction, and is economical to manufacture.

Having thus described the invention, what is claimed is:

1. A manual tool for marking a trace that substantially duplicates a course of pavers at a constant distance spaced therefrom, comprising:

a tracking head constructed to be run along a course of pavers and being comprised of a top plate and a side plate, said top and side plates having generally planar inner surfaces disposed at a right angle to one another and defining an interior space that is open at the bottom, at the ends, and on one side, each of said plates having opposite end portions turned outwardly from said inner surface thereof;

a beam attached to said tracking head and extending therefrom in a non-obstructing relationship to said interior space and in a longitudinal direction generally perpendicular to, and away from, said inner surface of said side plate, said top plate being disposed to the inner side of said side plate;

a marking head mounted on said beam for positioning along the length thereof and having means thereon for affixing said marking head at selected distances away from said tracking head; and a handle mounted on said beam for positioning along the length thereof and having means thereon for affixing said handle at selected distances away from said tracking head.

2. The tool of claim 1 wherein said tracking head additionally includes means for receiving an upstanding post for rotation thereabout.

3. The tool of claim 1 wherein said tracking head includes a rectilinear mounting bar, and wherein said beam has a tubular rectilinear end portion, at least one of said mounting bar and said beam having an open end and being dimensioned and configured to telescopically receive, in said open end, the other of said mounting bar and said beam, said tool additionally including means for affixing said mounting bar at a plurality of positions of relative extension of said tracking head relative to said beam.

4. The tool of claim 1 wherein said marking head has means for fixedly attaching a marking implement thereon.

5. The tool of claim 4 wherein said marking head comprises an attachment part, for attaching the marking implement, and a mounting part for mounting said marking head on said beam, said parts of said marking head being joined for relative pivotal movement about an axis parallel to the longitudinal axis of said beam.

6. The tool of claim 1 wherein said handle is mounted on said beam in a position between said tracking head and said marking head and is pivotable relative to said beam, at least in a plane to which said beam is normal.

\* \* \* \* \*